Aug. 14, 1928.　　　　　　　　　　　　　　　　　　1,681,074
F. B. WHEAT
SECTIONAL PARTITION AND PANEL STRUCTURE
Filed Dec. 29, 1927　　　2 Sheets-Sheet 1
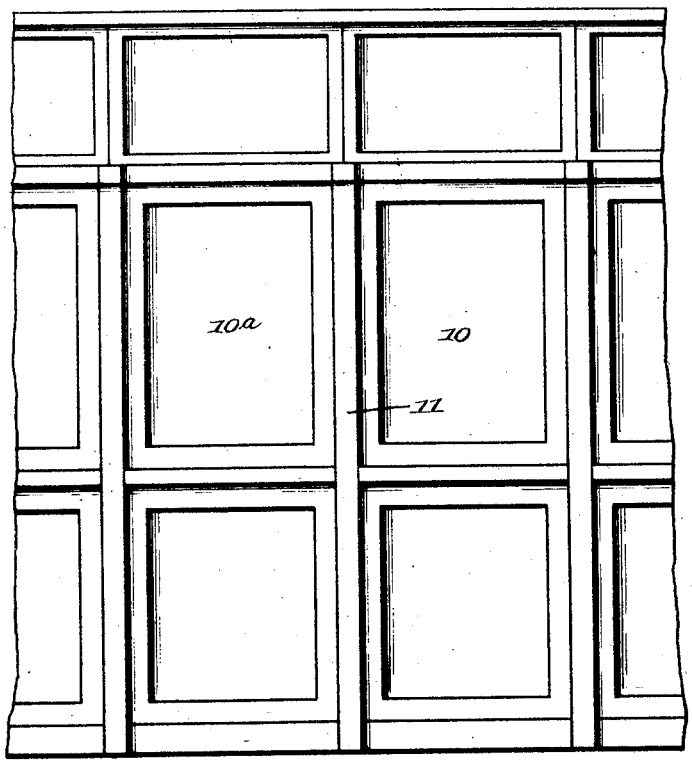
Fig. 1.
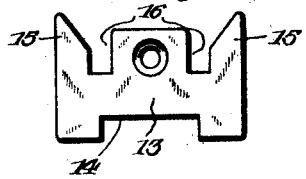
Fig. 4.
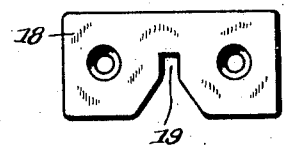
Fig. 4ª.
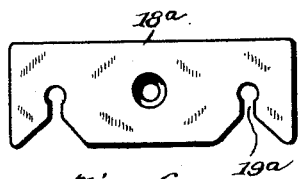
Fig. 6.
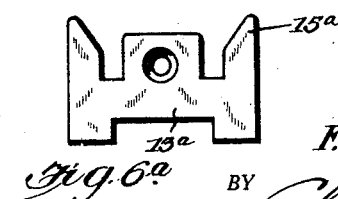
Fig. 6ª.
INVENTOR.
F. B. Wheat,
BY
his ATTORNEYS Aug. 14, 1928.  
F. B. WHEAT  
1,681,074  
SECTIONAL PARTITION AND PANEL STRUCTURE  
Filed Dec. 29, 1927  
2 Sheets-Sheet 2
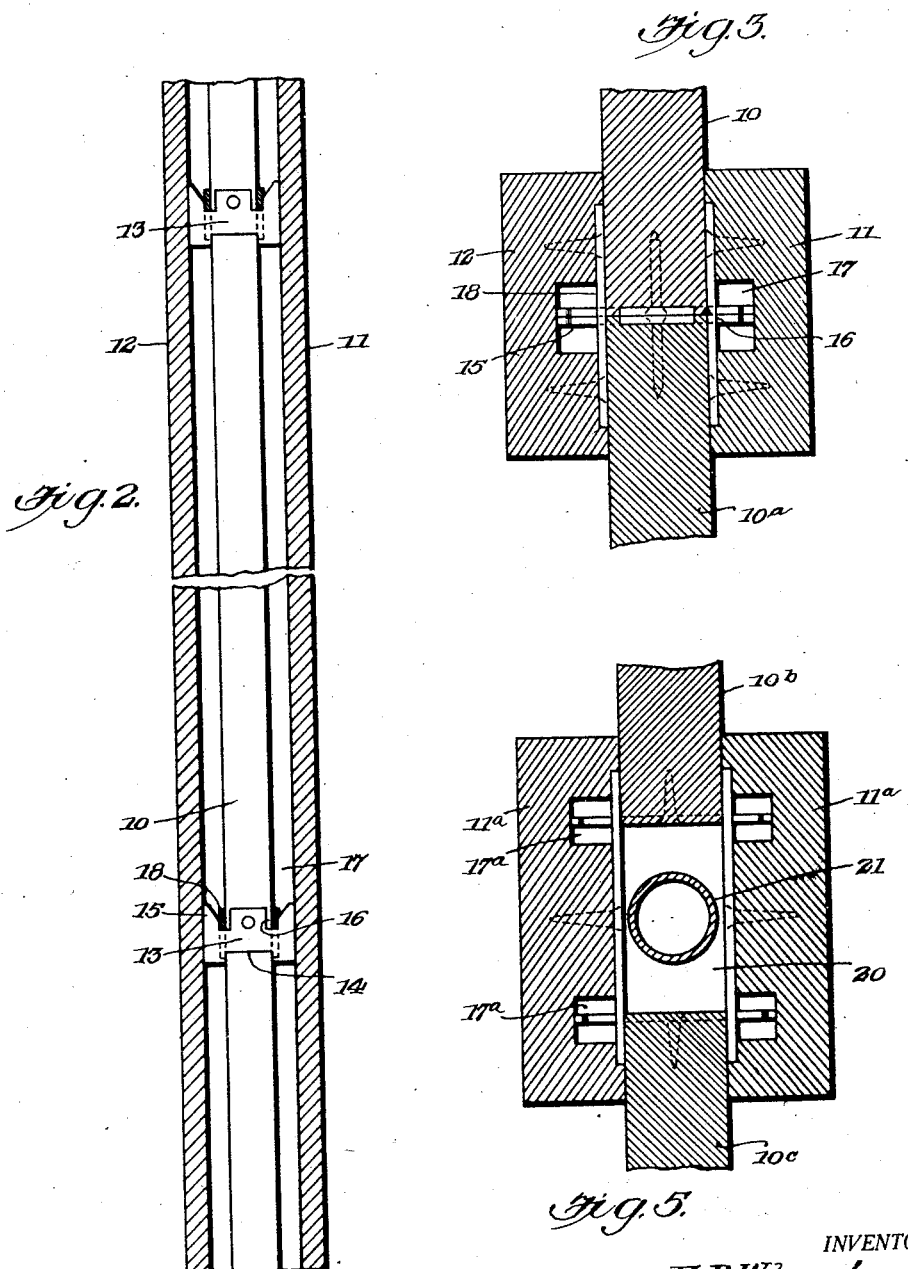
INVENTOR.  
F. B. Wheat,  
BY  
ATTORNEYS Patented Aug. 14, 1928.

1,681,074

UNITED STATES PATENT OFFICE.

FRANK B. WHEAT, OF LOS ANGELES, CALIFORNIA.

SECTIONAL PARTITION AND PANEL STRUCTURE.

Application filed December 29, 1927. Serial No. 243,335.

This invention relates to partition or panel structures composed of a multiplicity of sections whose juxtaposed edges are adapted to be concealed or covered by removable pilasters, said sections and pilasters being so interlocked as to permit them to not only be readily assembled, but to also permit of their being quickly disassembled.

A structure, such as this, is illustrated in applicant's prior Patent No. 1,626,259, dated April 26, 1927. In the structure of that patent the partition sections and pilaster carry cooperating locking elements for locking the pilaster to the sections. In the specific arrangement shown in that patent, locking elements on the sections project into a comparatively narrow recess in the pilaster so that the partition sections are held against movement away from one another by the locking members on the panel sections engaging against the walls of the recess in the pilaster. In order for the sections to be held close together, with such an arrangement, it is necessary that the recess and pilaster be comparatively narrow, thus making it a little difficult to assemble the partition. In view of this the present invention seeks to provide a sectional partition structure wherein the two sections are held together by the engagement of the cooperating locking elements on the sections and pilaster, it being immaterial whether or not the locking members on the sections engage against the walls of the recess into which they extend into the pilaster. This permits the recess and the pilaster to be made comparatively wide and, consequently, greatly facilitates the assembly of the partition. Preferably, this result is obtained, in the present instance, by having the pilaster formed with a comparatively wide recess bridged by a locking plate having a slot therein in which the locking members on the panel sections seat, the walls of the slot in said locking plate absolutely preventing movement of the panel sections away from one another.

Another object of the present invention is to provide a locking means for securing the pilaster and sections together with the panel sections spaced apart whereby a chase is provided in which an electrical conduit or the like may be placed, being completely hidden from view by the pilaster which overlies and completely conceals the space between the adjoining panel or sections.

In the accompanying drawings,—

Figure 1 is an elevational view of the partition embodying the present improvements.

Fig. 2 is a vertical sectional view, transversely of the partition.

Fig. 3 is a horizontal sectional view through a portion of the partition illustrating the meeting edges of two partition sections, with said sections abutting against one another.

Figs. 4–4ª are detail views of the locking members carried by the partition section and the pilaster.

Fig. 5 is a horizontal sectional view through a partition where the partition sections are adapted to be spaced from one another by the electrical conduits.

Figs. 6–6ª are detail views of the locking elements utilized in the arrangement illustrated in Fig. 5.

As illustrated in Fig. 1, the partition comprises any desired number of sections, two contiguous sections being indicated in this figure at 10, 10ª, the juxtaposed edges of said sections being concealed by the pilaster 11. It will be understood, of course, that where the partition is utilized for dividing off two rooms, a pilaster 12 is used on the opposite side as illustrated in Fig. 3.

For the purpose of securing the pilasters to the sections and for securing the sections to one another so that they cannot possibly move apart each partition section carries a locking plate 13 provided at its center with an aperture through which any suitable fastening element may be driven into the partition. To facilitate centering the locking member 13 on the edge of the partition section, said member has a central portion cut away at one edge for a width corresponding to the width of the partition as at 14. At its side edges the locking member 13 is provided with hook portions 15 there being a recess 16 between said hook portions and the body of the member.

The pilaster is provided with a comparatively wide recess 17 and attached to the pilaster, so as to bridge this recess, is a locking plate 18, having apertures therein for suitable fastening means that enter the pilaster. At its upper edge locking plate 18 has a slot 19 whose walls diverge somewhat at the edge of the plate and when the sections and pilaster are assembled the locking members 13 on the sections are adapted to extend past the locking plate into the recess in the pilaster, the hook portions 15 being hooked behind the locking plates, so to speak, with the locking members seated in the bottom portion of the recesses 19. By having the walls of the slots 19 flared insertion of the locking members in said slot is facilitated and after said locking members are once seated in said slot it will be impossible for the partition sections to be moved away from one another. In this connection, it will be seen that it is the engagement of the locking members 13 with the locking plate 18 that holds the partition sections against movement away from one another and it is immaterial whether or not said locking plates 13, or rather the hook members 15 thereof, abut against the side walls of the recesses 17 in the pilasters. For this reason the recesses 17 of the pilasters may be quite wide as compared with the thickness of the locking plates 13. For this reason, and the further reason that the walls of slot 19 are flared no great degree of accuracy is required in alining the several parts when the partition is being assembled.

Referring to the arrangement illustrated in Figs. 5, 6 and 6ᵃ, the partition sections 10ᵇ, 10ᶜ, are adapted to be spaced apart somewhat to provide a chase 20 in which an electrical conduit, or the like, 21, may be located. This is accomplished by having each pilaster 11ᵃ formed with two laterally spaced recesses 17ᵃ, each of said recesses being bridged by a locking plate 18ᵃ, preferably in one piece, and of sufficient length to span both of the recesses in the pilaster. Said locking plate 18ᵃ has two slots 19ᵃ therein each one of said slots being adapted to register with the recesses in the pilaster so that said slots may receive the locking members 13ᵃ, carried on the juxtaposed edges of the two partition sections 10ᵇ, 10ᶜ. For brevity, it might be said that each of the locking members 13ᵃ has the hook portions 15ᵃ as in the construction shown in Fig. 1, adapted to hook behind the locking plate 18ᵃ. In this modified arrangement, however, the widths of slots 19ᵃ, are somewhat narrower, as they only have to accommodate the single locking member 13ᵃ. In both of the constructions illustrated, it is the engagement between the locking plate on the pilaster and the locking members on the partition sections that holds said sections against movement away from one another or toward one another as the case may be. In neither construction is it necessary for the hook portion of the locking plate on the partition sections to engage against the walls of the recesses in the pilasters for this purpose.

What I claim is:

1. A sectional partition or panel structure comprising two juxtaposed sections, a pilaster separable from the sections and overlying the joint between the same, a locking element on said pilaster and cooperating locking elements on both sections engageable with the one locking element on the pilaster for locking said pilaster to said sections, the engagement between said locking elements being such as to prevent movement of the partition sections away from one another.

2. A sectional partition or panel structure comprising two juxtaposed sections, a pilaster separable from the sections and overlying the joint between the same, a locking member on each of said sections, a cooperating locking member on the pilaster with which both members on the sections engage, said pilaster having a recess therein into which the locking members on the sections extend, the side walls of said recess being spaced from said locking members projecting into said recess.

3. A sectional partition or panel structure comprising two juxtaposed sections, a pilaster separable from the sections and overlying the joint between the same, said pilaster having a comparatively wide recess therein, a plate on said pilaster bridging said recess and having a slot therein, and a locking member secured to each of said panel sections, both of said locking members engaging in the slot in said plate with their ends extending into the recess in the pilaster but spaced from the walls of said recess.

4. A sectional partition or panel structure comprising two panels or sections spaced from one another, a pilaster separable from said sections and overlying the space between the same, a locking element on the end face of each of said sections and a locking member on the pilaster cooperating with the locking members on both of said sections for locking the pilaster to said sections and for preventing movement of said sections toward one another whereby a chase for electrical conduits and the like is provided between said panel sections.

5. A sectional partition or panel structure comprising two panel sections spaced from one another, a pilaster separable from the sections and overlying the space between the same, a locking plate on said pilaster, and a locking member on each of said panel sections engaging said locking plate on the pilaster at points spaced transversely of the pilaster, said locking members securing the pilaster to said sections and the engagement between said locking members on the panel sections with the plate on said pilaster retaining the panel sections in spaced relation, whereby a chase for electrical conduits and the like is provided between said sections.

6. A sectional partition or panel structure comprising two panel sections, a pilaster separable from the sections and overlying the joint between said sections, said pilaster having recesses at laterally spaced points thereof, a locking member on the end face of each of said panel sections, and a locking plate bridging the recesses in said pilaster, the locking members on said panel sections engaging the locking plate on the pilaster to lock the pilaster to said sections and said locking means on the pilaster holding the locking members on said sections against movement laterally of the pilaster, whereby a chase may be provided between the sections for the reception of electrical conduits and the like.

7. A sectional partition or panel structure comprising two panel sections, a pilaster separable from the sections and overlying the space between the same, said pilaster having recesses therein spaced laterally thereof, a locking plate secured to said pilaster and bridging said recesses, and locking members secured to the end face of each of said panel sections engaging said locking plate for locking the pilaster to said sections and for locking said sections to prevent movement towards one another, the ends of said locking plates being spaced from the walls of the recesses in the pilaster.

8. A sectional partition or panel structure comprising two sections, a pilaster separable from the sections and overlying the joint between the same, said pilaster having two comparatively wide laterally spaced recesses therein, a locking plate bridging both of said recesses and having slots therein in registry with said recesses, and locking members on the end faces of said partition sections engaging in the locking plate slots with their end portions projecting into said recesses, but spaced from the side walls thereof.

FRANK B. WHEAT.